Nov. 27, 1945.  S. KROLL ET AL  2,389,671
BRAKE MECHANISM FOR BABY CARRIAGES
Filed June 26, 1944  2 Sheets-Sheet 1
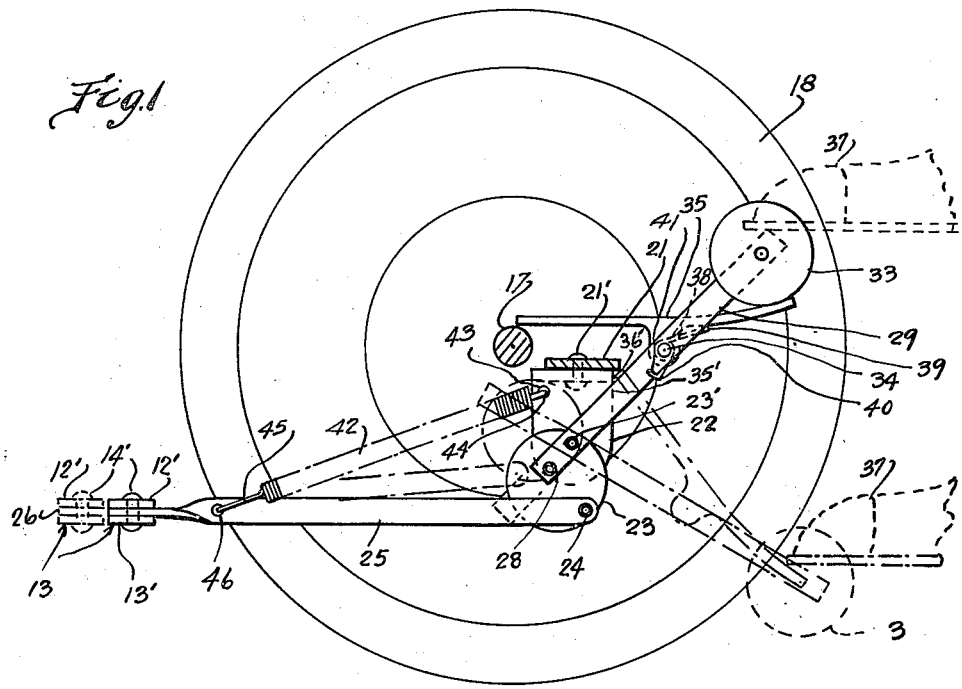
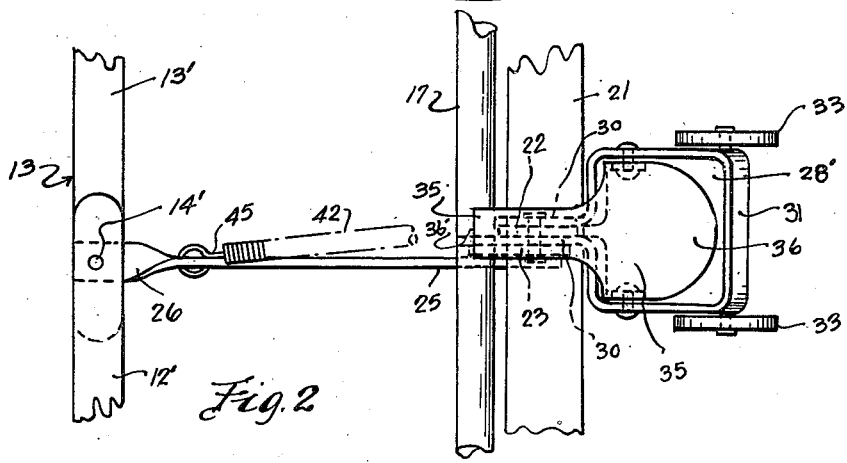
INVENTORS
SAMUEL KROLL
NATHAN J. KROLL
BY
Their Attorney Nov. 27, 1945.   S. KROLL ET AL   2,389,671
BRAKE MECHANISM FOR BABY CARRIAGES
Filed June 26, 1944     2 Sheets-Sheet 2
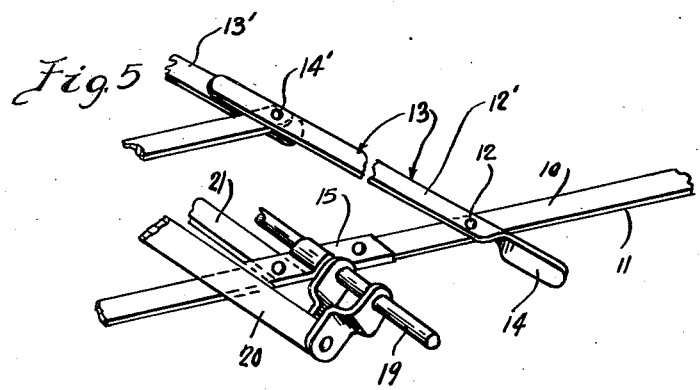
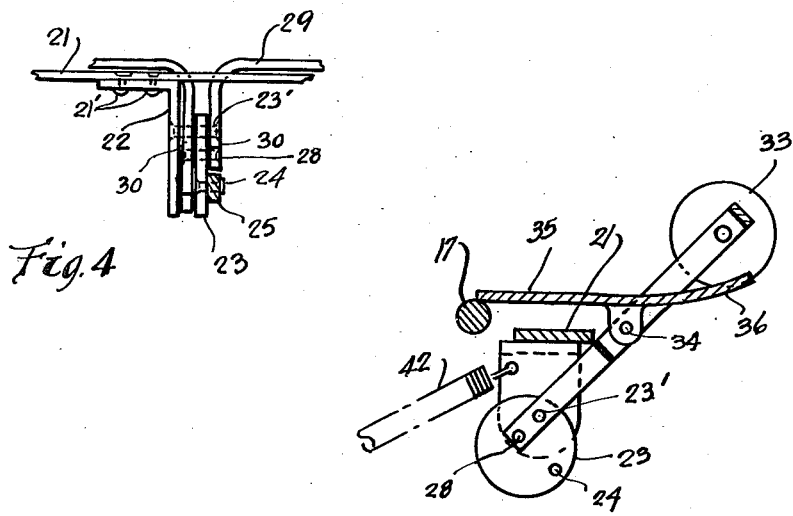
INVENTORS
SAMUEL KROLL
NATHAN J. KROLL
BY *Clarence E. Wheedy*
Their Attorney

Patented Nov. 27, 1945

2,389,671

UNITED STATES PATENT OFFICE 2,389,671

BRAKE MECHANISM FOR BABY CARRIAGES

Samuel Kroll and Nathan J. Kroll, Chicago, Ill.

Application June 26, 1944, Serial No. 542,124

4 Claims. (Cl. 188—20)

This invention relates to new and useful improvements in brake mechanism especially designed and constructed for use in connection with baby carriages.

The invention has among its salient objects the provision of an improved construction of this character which will be highly efficient in use and economical in manufacture. For the best and most effective braking action, it is desirable and essential that the brake operating mechanism be easy in operation as well as positive in such operation. Consequently among the salient objects of this invention is to provide a brake mechanism which will require the minimum of effort upon the part of the operator to effect the braking and unbraking of the vehicle.

Another object of the invention is the provision of brake mechanism requiring for its operation what we term "feather pressure," i. e., nothing more than a light pressure of the tip of the shoe thereon.

A still further and equally important object of the invention is to provide a brake mechanism for a baby carriage which will reduce to a minimum the possibility of the brake's becoming ineffective for braking purposes either by accident or otherwise.

Yet another object of the invention is the provision of a mechanism which performs the dual purpose of braking and anti-tilting, the latter preventing the tilting of the baby carriage.

Finally, an object of the invention is to provide a brake mechanism which comprises few parts, thus resulting in a brake mechanism which by reason of its few parts reduces to a minimum, repair or replacement.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a side elevational view of the brake mechanism embodied in this invention;

Fig. 2 is a fragmentary plan view of the same;

Fig. 3 is a fragmentary sectional detail view taken substantially on line 3—3 of Fig. 2;

Fig. 4 is a fragmentary sectional detail view taken substantially on line 4—4 of Fig. 1;

Fig. 5 is a fragmentary perspective view of a gear or chassis with which our brake mechanism is associated.

The drawings illustrate the preferred form of construction by which the several objects and best results of our invention are accomplished. This preferred form of construction as shown in these drawings comprises a chassis 10 (Fig. 5) having associated with the side rails 11 thereof, as at 12, a transversely extending brake bar 13 consisting of two bars 12' and 13' pivoted together as at 14' and providing brake fingers 14 (Fig. 5).

On the side rails 11 of the chassis 10 are carried suitable bearing plates 15 in which the axle 17 is journaled, said axle 17 carrying the usual wheels 18 on their wheel-bearing ends 19. To these axles 17 are connected the usual scissors frames 20 by which the chassis may be collapsed in a manner shown in our pending applications, Serial Nos. 533,132 and 533,133.

In the preferred form of construction we have shown attached to the side rails 11 a transverse bar 21. This bar 21 may, if desired, be formed as a part of the axle 17, in which case the ends of the bar 21 are tapered to provide the axle studs 19.

Our improved brake mechanism comprises a bracket 22. This bracket 22 is carried by the bar 21 as at 21' and extends downwardly therefrom. Pivotally connected to this bracket 22 as at 23' is a disc 23.

To this disc 23 has connection, as at 24 (Figs. 1 and 4), a rod 25. The end 26 of this rod is pivotally connected to the brake bar 13 at the pivotal connection 14'.

Fixed to this disc 23 as at 28 is a foot pedal 29. This foot pedal or lever 29 in the present instance is formed from an elongated strip of material bent U-shaped to provide the opposite limbs 30 which are connected, as before stated, to the disc 23 at 28.

The outer end portion 31 of this foot pedal 29 is enlarged as at 28' to provide a well for the reception of the toe 37 of the foot of the operator. The portion 31 of the foot pedal carries wheel elements 33 for reasons more fully hereinafter set forth.

Pivotally connected to the foot pedal 29 as at 34 is a latch bar 35. This latch bar 35 provides a curved plate-like end portion 36 which, when the foot pedal 29 is in the dotted line position shown in Fig. 1, is disposed within the toe well 28' in position to be engaged by the toe 37 of the foot of the operator in a manner and for the reasons hereinafter set forth.

The latch bar 35 is normally urged in the position shown in Fig. 1 by means of a spring 38, one end of which bears as at 39 upon the latch bar and the other end 40 of which is looped as at 41 upon the foot pedal 29. When in the dotted line position as shown in Fig. 1, the latch bar 35 bears against the edge 35' of the bracket 22, with the edge 36' thereof in latched engagement with the bar 21.

To complete the invention, there is provided a spring 42. The end 43 of this spring 42 is connected as at 44 to the bracket 22. The end 45 of the spring 42 is connected as at 46 to the rod 25, the arrangement being such that this spring 42 will urge the disc 23 to rotate about its pivot 23' in an anti-clockwise direction for reasons hereinafter set forth.

When in non-braking position, the parts are in the position shown in Fig. 1, with the latch bar 35 disposed above the axle 17. To effect braking of the wheels 18, the user places his toe 37 upon the foot pedal 29 and bears downwardly thereupon. This results in rotating the disc 23 to dispose the latch bar 35 in the position shown in dotted lines in Fig. 1, in which position the latch bar 35, under action of the spring 38, will engage beneath the plate 21 in bearing position against the edge 35' of the bracket 22 and latch the parts in the dotted line position shown in Fig. 1, which dotted line position is braking action with respect to the wheels 18. The parts will remain in this position as long as the latch bar 35 engages the plate 21.

As the disc 23 is rotated in a clockwise direction in the manner just described, the rod 25 will exert pivotal movement upon the brake rods 12' and 13' and cause the brake fingers 14 to be pivoted against the wheel 18, in which position the brake fingers 14 will remain as long as the latch bar 35 is in latched engagement with the plate 21.

To release the mechanism for return to its full line position as shown in Fig. 1, the operator places the toe 37 in position to engage the toe plate portion 36 of the latch bar 35, thus pivoting the latch bar 35 in a direction to disengage it from the bar 21 for automatic return to full line position as shown in Fig. 1.

As to spring 42, when the parts are in the dotted line position shown in Fig. 1, as soon as the latch bar 35 is disengaged from engagement with the plate 21, this spring 42 will urge the rotation of the disc 23 in an anticlockwise direction, returning the parts to their full line, non-braking position, as shown in Fig. 1. To release the latch bar 35 requires that degree of pressure of the toe 37 on the toe-engaging portion of the latch bar 35 which we prefer to call "feather pressure." Instantly with the release of the latch bar 35 from the plate 21, the spring 42 will effect rotation of the disc 23 and its associated parts will automatically return to their full-line, non-braking position as shown in Fig. 1. In this respect it is clear that the operation of the brake mechanism requires but a minimum of effort upon the part of the operator and that its action is positive and quick.

When the wheels 33 are in dotted line position as shown in Fig. 1, that is, with the mechanism in braking position, these wheels will be brought into engagement with the surface supporting the baby carriage in the event that the carriage is tilted, in which event the mechanism then serves as an anti-tilt device. As the wheels are of the rotatable type, return of the carriage to its normal level position may be effected by slight forward rotation of the wheels as distinguished from a scraping or rubbing action where a fixed anti-tilt bar is employed.

Simplicity of the invention is obvious from the foregoing description. It is clear that the mechanism is positive in operation and that when the mechanism is in braking condition, the parts cannot be dislodged so as to accidentally return to non-braking position.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. Brake mechanism for a wheel-bearing chassis in which there is a transversely extending brake rod and a mounting bar, comprising a supporting bracket carried by the mounting bar, a disc rotatably supported by the bracket, a foot-operated lever for rotating said disc in one direction, a connection between the disc and the brake rod, latch means carried by the foot lever and adapted to have latched engagement with the mounting bar, said latch means having a portion adapted to be engaged by the toe of an operator to pivot the latch means from engagement with said mounting bar, and means for effecting rotation of said disc in an opposite direction when said latch means is disengaged from said mounting bar.

2. Brake mechanism for a wheel-bearing chassis in which there is a transversely extending brake rod and a mounting bar, comprising a supporting bracket carried by the mounting bar, a disc rotatably supported by the bracket, a foot-operated lever including wheel elements adapted to be engaged by the toe of an operator for rotating said disc in one direction, a connection between the disc and the brake rod, latch means carried by the foot lever and adapted to have latched engagement with the mounting bar, said latch means having a portion adapted to be engaged by the toe of an operator to pivot the latch means from engagement with said mounting bar, and means for effecting rotation of said disc in an opposite direction when said latch means is disengaged from said mounting bar.

3. A brake mechanism comprising a brake rod operating member, a supporting bracket, a disc rotatably carried by the bracket, means connecting said brake operating member to said disc, a foot lever, means for connecting said foot lever to said disc, said disc being adapted to be rotated in one direction when pressure is applied to said foot lever, a mounting bar for said bracket, and latch means carried by said foot lever and adapted to have latched engagement with said mounting bar when said disc is rotated in said direction by pressure upon said foot lever, said brake operating member being moved into brake operating position upon rotation of said disc in said direction, and means for rotating said disc in an opposite direction when said latch means is disengaged from said mounting bar.

4. Brake mechanism comprising a brake rod operating member, a supporting bracket, a disc rotatably carried by the bracket, means connecting said brake operating member to said disc, a foot lever, means for connecting said foot lever to said disc, said disc being adapted to be rotated in one direction when pressure is applied to said foot lever, a mounting bar for said bracket, and latch means carried by said foot lever and adapted to have latched engagement with said mounting bar when said disc is rotated in said direction by pressure upon said foot lever, said brake operating member being moved into brake operating position upon rotation of said disc in said direction, and means for rotating said disc in an opposite direction when said latch means is disengaged from said mounting bar, said latch means having a curved portion adapted to be engaged by the toe of an operator for pivoting the latch means for latched engagement with said mounting bar.

SAMUEL KROLL.
NATHAN J. KROLL.